United States Patent [19]

Mosciatti et al.

[11] 4,264,936
[45] Apr. 28, 1981

[54] ALTITUDE CORRECTING VACUUM SYSTEM

[75] Inventors: Roger Mosciatti, Coram; Thomas P. Foley, Lloyd Harbor; Frederick G. Moritz, Hauppauge, all of N.Y.

[73] Assignee: Potter Instrument Company, Inc., Plainview, N.Y.

[21] Appl. No.: 948,483

[22] Filed: Oct. 4, 1978

[51] Int. Cl.$^2$ .................. G11B 15/58; G11B 15/46
[52] U.S. Cl. ........................... 360/71; 226/95; 242/182; 318/6; 360/90; 360/73
[58] Field of Search ............... 360/71, 73, 83, 90; 242/182-185; 226/91, 95, 97, 11, 118-119; 318/6-7, 310

[56] References Cited

U.S. PATENT DOCUMENTS

| | | | |
|---|---|---|---|
| 3,156,109 | 11/1964 | Fieldgate | 242/182 |
| 3,948,463 | 4/1976 | Godbout | 242/182 |
| 3,961,441 | 10/1975 | Jones | 360/71 |
| 4,019,694 | 4/1977 | Fare et al. | 242/182 |

Primary Examiner—Alfred H. Eddleman
Attorney, Agent, or Firm—Alfred W. Barber

[57] ABSTRACT

A blower motor providing vacuum as, for example, for a magnetic tape handler, is programmed to provide a constant vacuum in an environment of changing altitudes. The blower motor is controlled by a pressure transducer which speeds up the motor as the altitude is increased and slows down the motor as the altitude is decreased.

6 Claims, 3 Drawing Figures

U.S. Patent
Apr. 28, 1981
4,264,936
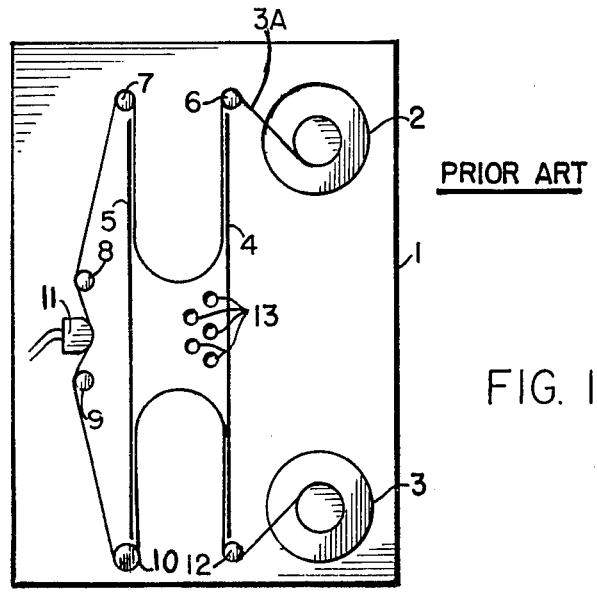
PRIOR ART
FIG. 1
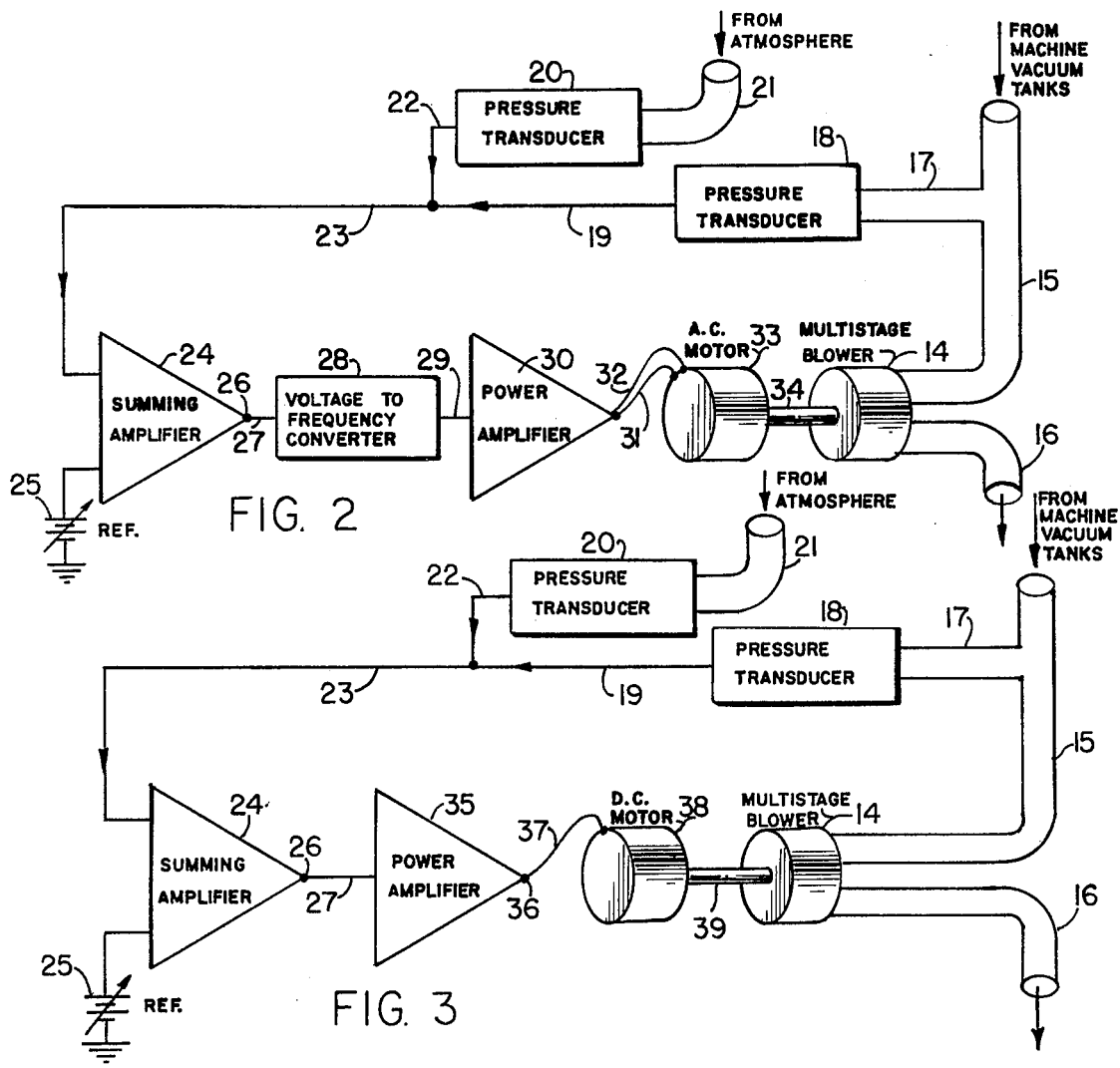
FIG. 2
FIG. 3

ALTITUDE CORRECTING VACUUM SYSTEM

PRIOR ART

Tape handlers in magnetic tape memory systems for computers and the like employ reels of magnetic tape which is passed rapidly over a record/play-back magnetic head. Such a system requires sudden starting, stopping and reversals of tape travel. The faster these changes in tape speed and direction, the more efficient is the use of the tape since recording and play-back cannot take place during the slow down and speed up intervals required to safely start and stop the tape. The tape is moved past the record/play-back head by means of a light weight capstan driven by a fast programmable light weight motor. This combination provides the fast starts, stops and constant running speed of the tape during the record and play-back cycles of operation.

However, in order to provide a high capacity memory capability in these magnetic tape handlers, large reels capable of storing hundreds of feet of tape are used before and after the capstan. These large reels are relatively heavy and require relatively large driving motors. In order to be able to use reasonable size motors, their slower starting and stopping times when compared with the capstan are accommodated by means of substantial slack loops before and after the capstan. These loops are maintained under low tension by means of vacuum tanks, one before and one after the capstan. Dynamically, when the tape is being moved at a constant speed, a degree of vacuum is maintained which will keep the average loops of tape within the vacuum tanks within a predetermined area. During stopping and starting deceleration and acceleration, these loops are pulled into much shorter loops or dropped into much larger loops. The relative acceleration and deceleration of the capstan and tape reels, and the degree of maintaining vacuum determine the required capacity of these vacuum tanks since during these transient periods the tape must not be pulled completely out of a tank or allowed to enter fully into a tank.

PRESENT INVENTION

A multistage blower is used to provide the vacuum in the prior art tape handling system as described above. The description sounds as though the vacuum draws the tape into the vacuum chamber. Actually atmospheric pressure which is greater than the vacuum pressure pushes the tape into the vacuum chambers. More precisely, the difference between the atmospheric pressure and the vacuum pressure is what does the pushing. A typical tape handler is designed to provide the required pressure differential at normal atmospheric pressure i.e. at or near sea level pressure.

However, if the conventional tape handler is operated above or below normal atmospheric pressure i.e. substantially above or below sea level, the typical vacuum system malfunctions either pulling tape too far in to the tanks or not far enough.

In accordance with the present invention, both the machine vacuum pressure and the atmospheric pressure are sensed. These two sensed valves properly weighted are used to increase or decrease the machine vacuum as by speeding up or slowing down the machine vacuum blower in order to maintain a predetermined pattern of pressure differential at all altitudes.

There are two preferred ways in which the blower motor speed is controlled in accordance with combined atmospheric and blower pressure. According to one method, the sensed pressures are combined, compared with a reference in a summing amplifier and the resulting error voltage is applied to a voltage to frequency converter the output of which is applied to a power amplifier which, in turn, drives a variable speed A.C. blower motor. According to the other method the error voltage from the summing amplifier is amplifed and applied to a variable speed D.C. blower motor. Both of these methods are essentially degenerative feed-back system due to the sensing of the machine vacuum.

IN THE DRAWING:

FIG. 1 is a view in perspective of a prior art tape handler to which the concepts of the present invention are applicable.

FIG. 2 is a block diagram of one of the two preferred forms of the present invention.

FIG. 3 is a block diagram of the second of the two preferred forms of the present invention.

FIG. 1 is a view in perspective of a prior art tape handler in which a panel and cabinet 1, carry two tape reels 2 and 3 rotated by suitable motors, not shown. The magnetic tape 3 passes from supply reel 2 to take-up reel 3. Its path is over idler 6 into the top section of vacuum tank 4-5, over idlers 7 and 8, across record/play-back head 9, over idler 9 to drive capstan 10 rotated by a suitable motor, not shown, over idler 11 into the lower end of vacuum tank 4-5, and over idler 12 to take-up reel 3. Vacuum is supplied to vacuum chamber 4-5 by means of suitable openings 13 and a suitable blower, not shown. It is conventional in prior art tape handlers to provide a multiple stage blower driven by a constant speed motor to provide vacuum which may then be adjusted to a suitable constant vacuum by means of a suitable control valve.

FIG. 2 is a block diagram of one of the two preferred form of the present invention which provides automatic vacuum control for changes in atmosphere pressure as, for example, changes due to changes in altitude. A multistage blower 14 supplies machine vacuum over closed tube 15 and exhausts sucked out air over pipe 16. Closed tube 15 is to be coupled to the vacuum openings in the tape handler as openings 13 of FIG. 1. In order to control the speed of blower 14 as a function of the altitude and/or atmospheric pressure, the machine vacuum is sensed by means of a pressure transducer 18 coupled to the machine vacuum over closed tube 17 and atmospheric pressure is sensed by a pressure transducer 20 coupled to the atmosphere over pipe 21. These two sensors provide D.C. output voltages which are proportional to their sensed pressures. Thus, if the output of transducer 18 is subtracted from the output of transducer 20, the resultant voltage will be proportional to the difference between the atmospheric pressure and the machine vacuum pressure. These outputs are conducted over leads 19 and 22 and combined over lead 23 to summing amplifier 24 where they are compared with a reference voltage 25 thereby providing an error voltage at output terminal 26. When this error voltage approaches zero, the differential pressure generated voltages will approach the reference voltage.

In order to control the machine vacuum pressure at a constant difference in comparison with the atmospheric pressure, the error voltage at ouput 26 is applied to voltage to frequency converter 28 over lead 27, the controlled frequency from converter 28 is applied over lead 29 to power amplifier 30 which in turn drives blower AC. motor 33 over leads 31 and 32. The blower speed thus controlled provides a machine vacuum at a pressure which is a predetermined fixed difference below atmospheric pressure. If the difference drops due to increased altitude, the error voltage increases, the motor driven frequency increases and the blower speeds up to restore the predetermined difference in pressure. The system is, in effect, a feedback system.

FIG. 3 is a block diagram of the second preferred form of the present invention. The pressure sensing and summing are the same as shown in FIG. 2 and described above. The difference is the way in which the error voltage from summing amplifier 24 is converted to a controlled blower speed. In FIG. 3 the error voltage at output 26 of summing amplifier 24 is applied over lead 27 to a D.C. power amplifier 35 which in turn drives D.C. motor 38 over leads 37. The D.c. motor drives blower 14 over shaft 39. Since the D.C. motor speed is proportional to its applied D.C. voltage it will speed up increasing the blower speed and hence the machine vacuum until the predetermined pressure difference is restored or maintained.

While pressure transducers 18 and 20 as shown in FIGS. 2 and 3 are described as analog devices, digital transducers may also be used for one or both. Where the summing amplifiers require analog input signals, the digital outputs of the digital transducers are merely converted to analog siganls by means of suitable digital to analog converters.

While only two preferred forms of the present invention have been shown and described, modifications are possible within the spirit and scope of the invention as set forth in particular in the appended claims.

I claim:

1. In a vacuum buffer system for a magnetic tape handler, the combination of;
    a motor coupled to a vacuum blower;
    means for utilizing vacuum from said blower in a magnetic tape handler;
    means for sensing atmospheric pressure;
    and means for increasing the speed of said motor when said sensed pressure decreases substantially from normal sea level pressure.

2. In a vacuum buffer system for a magnetic tape handler, the combination of;
    an electric motor coupled to a vacuum blower for providing vacuum to the vacuum tanks of a magnetic tape handler;
    means for providing a first voltage as a function of atmospheric pressure;
    means for providing a second voltage as a function of the vacuum tank pressure of the magnetic tape handler;
    means for combining said two voltages and comparing the combined voltages with a reference voltage;
    and means for controlling the speed of said motor in accordance with the difference between said combined voltages and said reference voltage in a direction tending to reduce said difference.

3. A vacuum buffer system for magnetic tape handlers as set forth in claim 2, and
    wherein said means for controlling the speed of said motor includes a voltage to frequency converter and a power amplifier.

4. A vacuum buffer system for magnetic tape handlers as set forth in claim 2, and
    wherein said motor is a DC motor;
    and said means for controlling the speed of said motor includes a DC power amplifier.

5. A vacuum buffer system for magnetic tape handlers as set forth in claim 3, and
    wherein said motor is an AC motor.

6. A vacuum buffer system for magnetic tape handlers set forth in claim 2, and
    wherein said means for providing a first voltage includes a digital pressure transducer followed by a digital to analog converter.

* * * * *